US012286298B2

(12) United States Patent
Minematsu et al.

(10) Patent No.: US 12,286,298 B2
(45) Date of Patent: Apr. 29, 2025

(54) AUTOMATED STORAGE AND RETRIEVAL SYSTEM

(71) Applicant: Murata Machinery, Ltd., Kyoto (JP)

(72) Inventors: Masakazu Minematsu, Inuyama (JP); Michinobu Wakizaka, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 254 days.

(21) Appl. No.: 17/919,556

(22) PCT Filed: Mar. 9, 2021

(86) PCT No.: PCT/JP2021/009395
§ 371 (c)(1),
(2) Date: Oct. 18, 2022

(87) PCT Pub. No.: WO2021/215132
PCT Pub. Date: Oct. 28, 2021

(65) Prior Publication Data
US 2023/0356945 A1 Nov. 9, 2023

(30) Foreign Application Priority Data
Apr. 24, 2020 (JP) ................................. 2020-077702

(51) Int. Cl.
*B65G 1/06* (2006.01)
*B65G 1/04* (2006.01)
*B65G 1/137* (2006.01)

(52) U.S. Cl.
CPC ............ *B65G 1/06* (2013.01); *B65G 1/0492* (2013.01); *B65G 1/1373* (2013.01)

(58) Field of Classification Search
CPC ...... B65G 1/06; B65G 1/0492; B65G 1/1373; B65G 1/1378
See application file for complete search history.

(56) References Cited

U.S. PATENT DOCUMENTS

| 7,381,022 B1 * | 6/2008 | King ................... B65G 1/1375 |
| | | 414/807 |
| 2016/0264356 A1 * | 9/2016 | Wakizaka ............... B65G 1/06 |

(Continued)

FOREIGN PATENT DOCUMENTS

| JP | H06-166403 A | 6/1994 |
| JP | H07-277419 A | 10/1995 |

(Continued)

OTHER PUBLICATIONS

International Search Report dated May 25, 2021 in counterpart International Application No. PCT/JP2021/009395.

(Continued)

*Primary Examiner* — Jonathan Snelting
(74) *Attorney, Agent, or Firm* — DLA Piper LLP (US)

(57) ABSTRACT

An automated storage and retrieval system includes: an automated storage including racks each of which includes shelf units in tiers in a vertical direction, where each shelf unit can store loads, and transport vehicles each of which moves along the corresponding ones of shelf units and includes a first transfer device that transfers a load to and from each rack; relay devices each of which transports a load transferred by the first transfer device in a corresponding one of the transport vehicles; and a lift and transport device that includes a second transfer device that transfers a load to and from each relay device, and raises or lowers the second transfer device. The second transfer device includes at least one arm that extends to a route along which the relay device transports a load, and transfers a load based on forward or backward movement of the at least one arm.

6 Claims, 6 Drawing Sheets

(56) References Cited

U.S. PATENT DOCUMENTS

2019/0375590 A1\* 12/2019 Gravelle ................ B65G 1/137
2020/0062506 A1 2/2020 Kakinuki et al.

FOREIGN PATENT DOCUMENTS

| | | |
|---|---|---|
| JP | 2003-012117 A | 1/2003 |
| JP | 2014-159340 A | 9/2014 |
| JP | 2015-168573 A | 9/2015 |
| JP | 2016-060622 A | 4/2016 |
| JP | 2017-088403 A | 5/2017 |
| JP | 2020-029323 A | 2/2020 |
| WO | 2012/147261 A1 | 11/2012 |
| WO | 2015/058192 A1 | 4/2015 |

OTHER PUBLICATIONS

Written Opinion dated May 25, 2021 in counterpart International Application No. PCT/JP2021/009395.

\* cited by examiner

AUTOMATED STORAGE AND RETRIEVAL SYSTEM

TECHNICAL FIELD

This disclosure relates to an automated storage and retrieval system including: automated storages each including transport vehicles each of which travels along the corresponding ones of shelf units in tiers included in racks; and devices that carry loads into or out from the automated storages.

BACKGROUND

Conventionally, an automated storage includes: racks each of which includes shelf units in tiers in a vertical direction, where each of the shelf units can store loads along an axis in a horizontal plane; and transport vehicles each of which moves along the corresponding ones of the shelf units and includes a transfer device that transfers a load between the transport vehicle and each of the racks (see WO 2012/147261, for example). Such an automated storage is capable of simultaneously transporting loads at high speed to move loads stored in the racks in the automated storage.

Unfortunately, there is a problem in the following situation. In carrying loads into or out from such an automated storage, the following devices may be provided: conveyors each of which transports loads along the axis in the horizontal plane and transfers loads between the conveyor and a corresponding one of the transport vehicles each being provided for a different one of the tiers; a lift and transport device that raises or lowers a load to a level corresponding to the location of a corresponding one of the conveyors each being provided for a different one of the tiers; and a switching device that is provided at an end portion of each of the conveyors and switches between a direction in which the lift and transport device transfers loads and the transport direction of the conveyor. The problem is that the number of devices required for carrying loads into or out from the automated storage increases.

It could therefore be helpful to provide an automated storage and retrieval system capable of carrying loads into or out from an automated storage using a smaller number of devices.

SUMMARY

We thus provide an automated storage and retrieval system that includes: an auto-mated storage including (i) racks each of which includes shelf units in tiers in a vertical direc-tion, where each of the shelf units being a shelf unit in which loads are storable along an axis in a horizontal plane, and (ii) transport vehicles each of which moves along corresponding ones of the shelf units and includes a first transfer device that transfers a load between the transport vehicle and each of the racks; relay devices each of which is disposed at a level corresponding to a location of the first transfer device in a corresponding transport vehicle among the transport vehicles, where a load is transferred between the relay device and the corresponding transport vehicle by the first transfer device; and a lift and transport device including (i) a second transfer device that transfers a load between the lift and transport device and each of the relay devices, and (ii) a tray that ascends or descends together with the second transfer device. The second transfer device in the lift and transport device (i) includes at least one arm that extends to one relay device among the relay devices, in a direction intersecting a direction in which the one relay device transports a load, and (ii) transfers a load based on forward or backward movement of the at least one arm, and each of the relay devices transports a load in a direction intersecting a traveling direction of the corresponding transport vehicle in the horizontal plane.

With our automated storage and retrieval system, it is possible to carry loads into or out from automated storages with high efficiency using a reduced number of devices required for carrying loads into and out from the automated storages.

Figure 1:
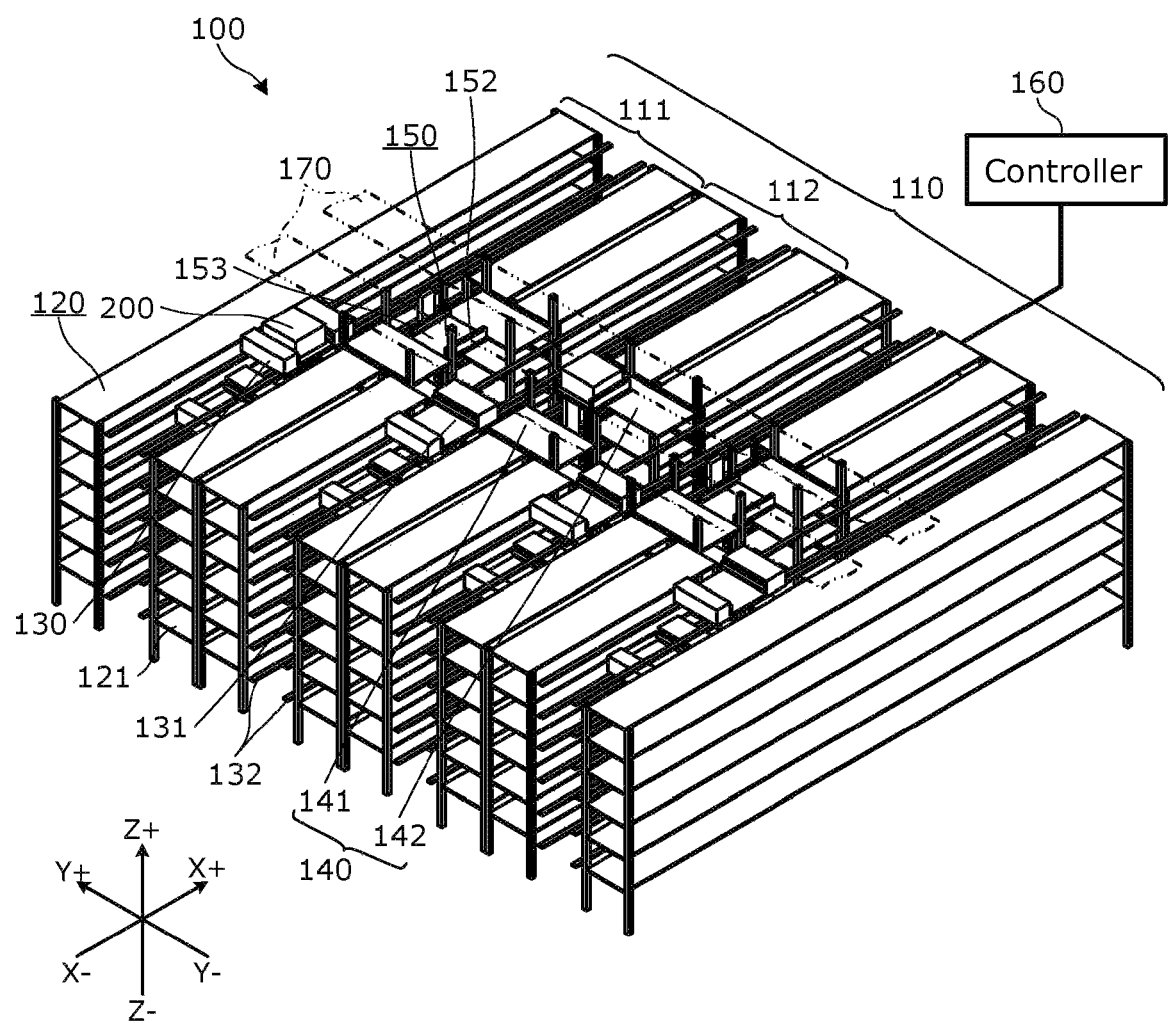
FIG. 1 is a perspective view of an automated storage and retrieval system.

REFERENCE SIGNS LIST 100 automated storage and retrieval system
110 automated storage
111 first automated storage
112 second automated storage
120 rack
121 shelf unit
130 transport vehicle
131 first transfer device
132 rail
140 relay device
141 first transport device
142 second transport device
150 lift and transport device
152 second transfer device
153 tray
154 arm
155 hook
160 controller
170 carry-in and carry-out device
171 picking station
200 load

DETAILED DESCRIPTION

Next, examples of an automated storage and retrieval system will be described with reference to the drawings. The examples described below each show a generic or specific example of our systems. The numerical values, shapes, materials, elements, the arrangement and connection of the elements, steps, an order of the steps and the like, indicated in the following examples are merely examples, and therefore are not intended to limit the scope of this disclosure. Among elements in the following examples, those not recited in any one of the independent claims are described as optional elements.

Moreover, the drawings are schematic illustrations in which emphasis, omission, and ratio adjustment are made where necessary to illustrate the systems. Accordingly, the shapes, positional relationships, and ratios of elements may be different from the actual shapes, positional relationships, and ratios of the elements.

Figure 2:
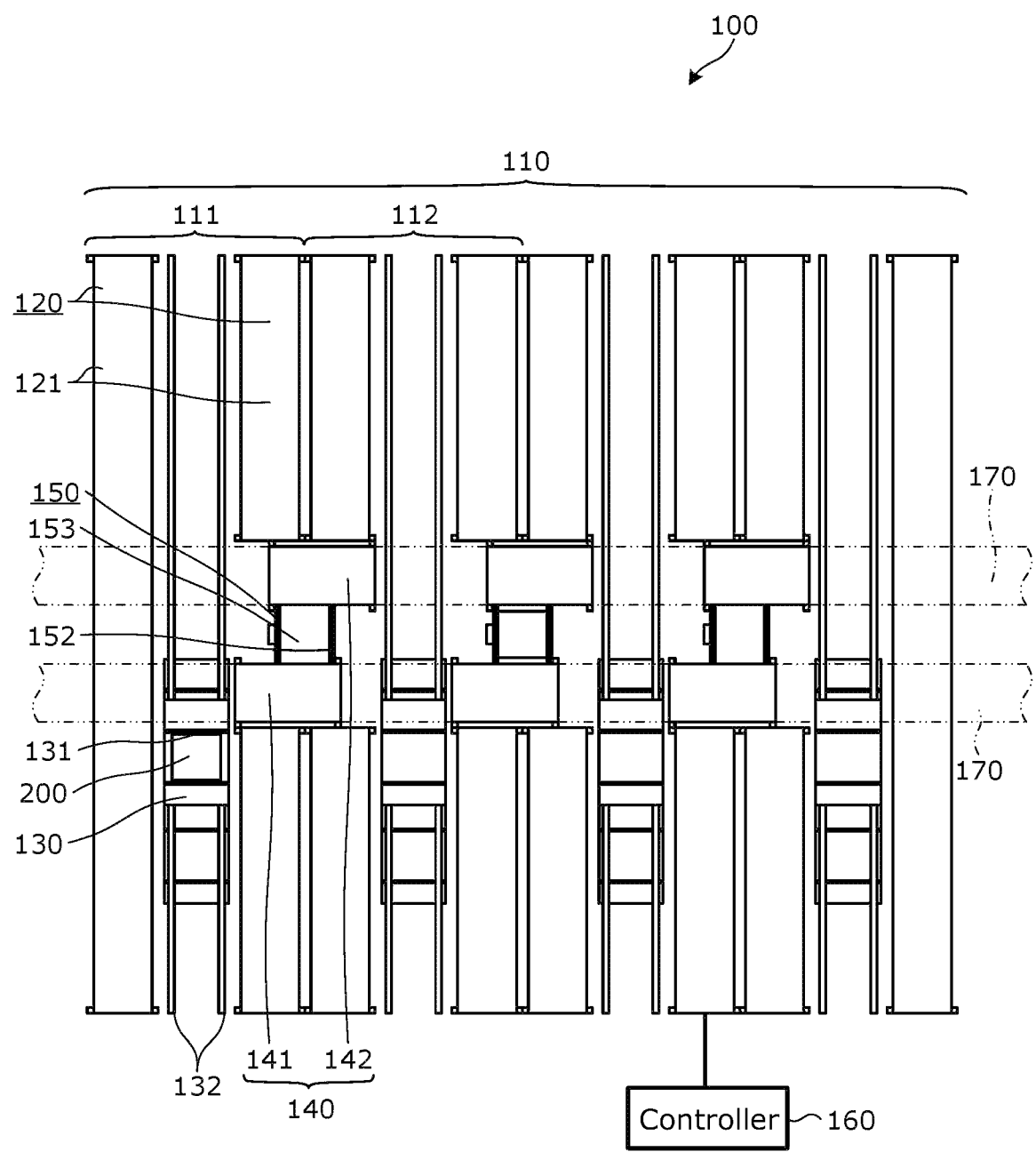
FIG. 2 is a plan view of the automated storage and retrieval system.

FIG. 1 is a perspective view of automated storage and retrieval system 100. FIG. 2 is a plan view of automated storage and retrieval system 100. The illustration of pillars or the like may be omitted from these figures. As illustrated in these figures, automated storage and retrieval system 100 is a system capable of automatically storing, in racks 120, loads 200 carried in from outside and automatically carrying out loads 200 stored in racks 120, and includes automated storages 110, relay devices 140, and lift and transport devices 150. In this example, automated storage and retrieval system 100 also includes carry-in and carry-out devices 170.

Each of automated storages 110 includes: racks 120 each including shelf units 121 in tiers in a vertical direction (the Z-axis direction in the figures), where each of shelf units 121 can store loads 200 along an axis (the X-axis direction in the figures) in a horizontal plane (the X-Y plane in the figures); and transport vehicles 130 each of which moves along the corresponding ones of shelf units 121 in racks 120 and includes first transfer device 131 that transfers load 200 between transport vehicle 130 and each of the corresponding ones of shelf units 121. In this example, automated storage and retrieval system 100 includes four automated storages 110. One automated storage 110 of adjacent automated storages 110 among automated storages 110 is first automated storage 111 and the other of the adjacent automated storages 110 is second automated storage 112.

Each of racks 120 is equipment including shelf units 121 in tiers in a vertical direction, where each of shelf units 121 can store loads 200 in a horizontal direction (the X-axis direction in the figures) in a vertical plane (the X-Z plane in the figures). In this example, racks 120 are aligned in parallel to each other along a normal direction (the Y-axis direction in the figures) to the vertical plane in automated storage 110. At least one of racks 120 aligned in the normal direction to the vertical plane is separated at at least one location in the middle of rack 120 in the direction in which rack 120 extends.

Each of transport vehicles 130 is a device that travels along rails 132 disposed at a level corresponding to the location of the corresponding ones of shelf units 121 in racks 120, and can hold load 200. First transfer device 131 is attached to each of transport vehicles 130.

Rail 132 is a rod-shaped member disposed at a level corresponding to the location of each of shelf units 121 in rack 120 along one side of rack 120, and extends in a horizontal direction (the X-axis direction in this example) in the vertical plane. Shelf unit 121 at which rail 132 is disposed is not specifically limited to an example described above, but in this example, since first transfer device 131 attached to transport vehicle 130 can transfer any one load 200 but among loads 200 stored in one shelf unit 121, rail 132 is disposed at a level corresponding to the location of each of shelf units 121 in rack 120.

First transfer device 131 attached to each of transport vehicles 130 is a device that can transfer load 200 between transport vehicle 130 and each of racks 120 and also between transport vehicle 130 and a corresponding one of relay devices 140. First transfer device 131 transfers load 200 by sliding or lifting load 200 in a direction (the Y-axis direction in the figures) intersecting (including being orthogonal to) the traveling direction of transport vehicle 130 (the X-axis direction in the figures). The transfer methods employed by first transfer device 131 are not specifically limited to those described above, and may include, for example, sliding load 200 between transport vehicle 130 and rack 120 by pushing or pulling the lateral surfaces of load 200, lifting load 200 using a fork or the like, and clamping load 200.

Each of relay devices 140 is disposed at a level corresponding to the location of first transfer device 131 in corresponding transport vehicle 130 among transport vehicles 130, and load 200 is transferred between relay device 140 and corresponding transport vehicle 130 by first transfer device 131 in a direction intersecting (orthogonal to) a direction in which arms 154 of second transfer device 152 which is to be described later move in the horizontal plane. Each of first transport devices 141 and a corresponding one of second transport devices 142 are provided at the same level and displaced in a direction (the X-axis direction in the figures) orthogonal to a direction in which load 200 is transported. The type of relay device 140 is not specifically limited to the above, but in this example, relay device 140 may be equipped with a function to transport load 200 and may be, for example, a conveyor such as a belt conveyor or a roller conveyor. Transporting load 200 in the horizontal plane includes also transporting load 200 along a slope inclined by a few degrees.

In this example, each of relay devices 140 is disposed at a level corresponding to the location of a different one of shelf units 121 in rack 120, and transports load 200 in a direction intersecting (orthogonal to) the traveling direction of corresponding transport vehicle 130 in the horizontal plane. Relay devices 140 are disposed to overlap each other in a vertical direction. Each of relay devices 140 is disposed, whichever level it may be, between one of racks 120 separated in the direction in which rack 120 extends and a route along which lift and transport device 150 ascends or descends, and is disposed between separated racks 120.

First automated storage 111 includes first transport devices 141 as relay devices 140, and second automated storage 112 includes second transport devices 142 as relay devices 140. Load 200 is transferred between each of first transport devices 141 and corresponding transport vehicle 130 among transport vehicles 130 included in first automated storage 111 by first transfer device 131 in corresponding transport vehicle 130. Load 200 is transferred between each of second transport devices 142 and corresponding transport vehicle 130 among transport vehicles 130 included in second automated storage 112 by first transfer device 131 in corresponding transport vehicle 130. Part of each of first transport devices 141 is disposed to protrude toward an area where second automated storage 112 is provided, whereas part of each of second transport devices 142 is disposed to protrude toward an area where first automated storage 111 is provided. With such an arrangement, it is possible to inhibit any dead space from being created between automated storages 110 while sharing lift and transport device 150 between automated storages 110.

Figure 3:
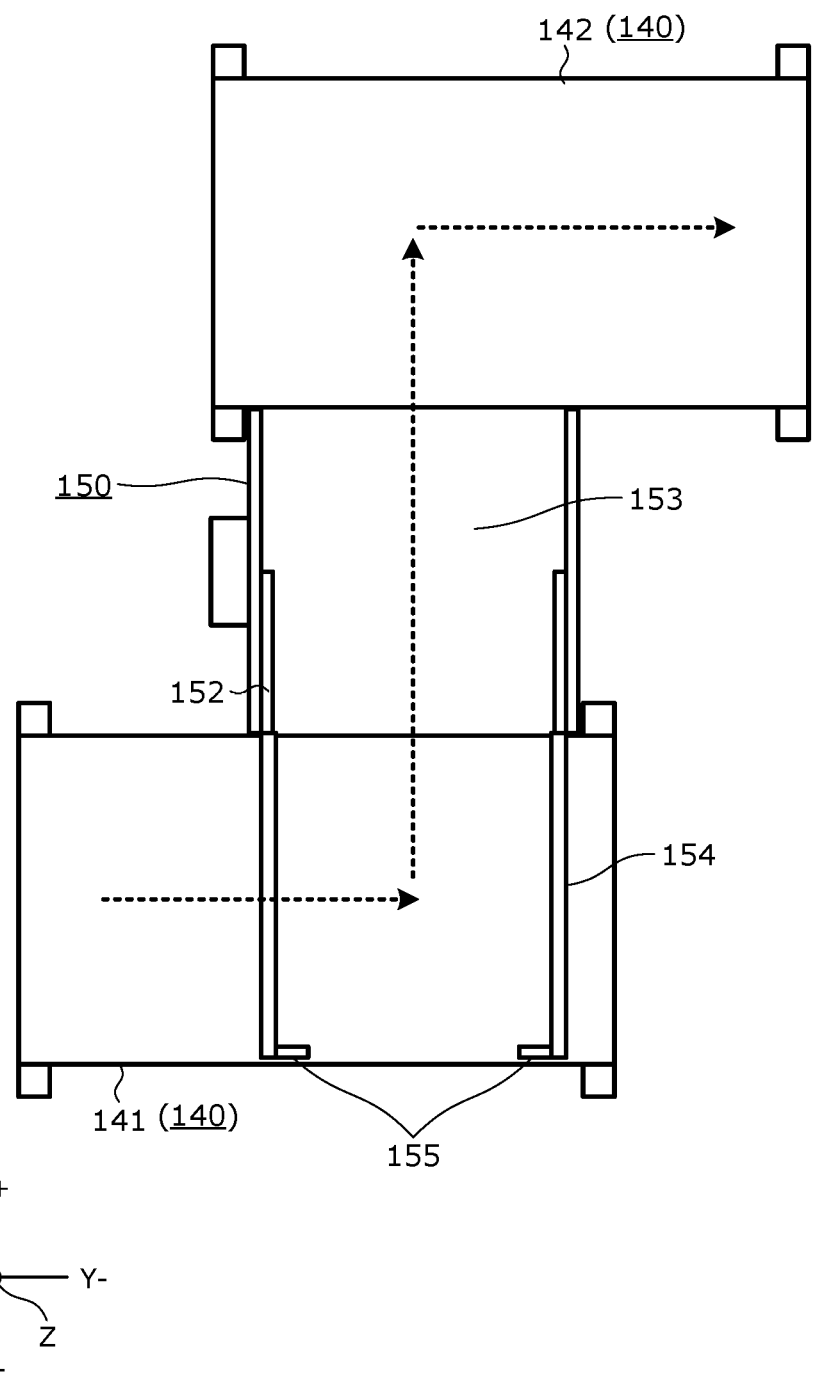
FIG. 3 is a plan view of a lift and transport device and relay devices.

FIG. 3 is a plan view of a lift and transport device and relay devices. Lift and transport device 150 is a device that raises or lowers, in a vertical direction, load 200 to be transferred between lift and transport device 150 and each of relay devices 140, and includes second transfer device 152 and tray 153. Lift and transport device 150 raises or lowers tray 153 to a desired level corresponding to the location of relay devices 140.

Tray 153 is a structural member that holds second transfer device 152 and ascends or descends together with second transfer device 152. In this example, tray 153 has a function to hold load 200 received from one of relay devices 140 by second transfer device 152.

Second transfer device 152 is a device that (i) transfers load 200 between lift and transport device 150 and each of the corresponding ones of relay devices 140, (ii) includes at least one arm 154 that extends to a route along which one relay device 140 among the corresponding ones of relay devices 140 transports load 200, in a direction (the X-axis direction in FIG. 3) intersecting a direction in which the one relay device 140 transports load 200, and (ii) transfers load 200 based on the forward or backward movement of at least one arm 154. The transfer method employed by second transfer device 152 is not specifically limited to the above and may be, for example: sliding load 200 between lift and transport device 150 and relay device 140 by pushing or pulling the lateral surfaces of load 200 using arms 154; lifting load 200 using arm 154 that functions as a fork; or clamping load 200.

In this example, in a space between first transport devices 141 and second transport devices 142, corresponding lift and transport device 150 among lift and transport devices 150 is disposed, and second transfer device 152 attached to tray 153 of corresponding lift and transport device 150 transfers load 200 between each of first transport devices 141 and a corresponding one of second transport devices 142. As indicated by a dotted arrow in FIG. 3, one first transport device 141 transports load 200 from a corresponding one of transport vehicles 130 in first automated storage 111 to corresponding lift and transport device 150 along a one-way route. Corresponding second transport device 142 transports load 200 from corresponding lift and transport device 150 to a corresponding one of transport vehicles 130 in second automated storage 112 along the one-way route. By thus allowing second transfer device 152 to transfer load 200 along a one-way route, it is easier to determine, for instance, the presence or absence of load 200 based on a direction in which second transfer device 152 transfers load 200. This makes it possible to simplify the arrangement of sensors for determining the presence or absence of load 200. Since control can be performed based on a transfer site and the presence or absence of load 200 such as when load 200 is detected at the transfer site of first transport device 141, load 200 can be taken in toward lift and transport device 150, and when load 200 is not detected at the transfer site of second transport device 142, load 200 can be taken out from lift and transport device 150 toward second transport device 142, it is easier to perform such determinations. Moreover, by allowing the transport of loads 200 to be one way and sharing lift and transport device 150 between first automated storage 111 and second automated storage 112, it is possible to hand over load 200 between the automated storages. Since load 200 traverses across the automated storages via lift and transport device 150, it is possible to change the level of load 200 according to the location of shelf unit 121 which load 200 is to be stored in or retrieved from, and allow load 200 to traverse across the automated storages in such a setting.

Controller 160 included in automated storage and retrieval system 100 (see FIG. 1 or 2) controls second transfer device 152 so that the speed of arms 154 moving toward first transport device 141 is faster than the speed of arms 154 moving toward second transport device 142. As described above, first transport device 141, second transfer device 152, and second transport device 142 work together to transport load 200 along a one-way route, and this makes it possible to move arms 154 at a relatively high speed since there is no need to transport 200 when arms 154 of second transfer device 152 extend toward first transport device 141. It is thus possible to enhance transport efficiency on the whole. By allowing the flow of load 200 to be one way, as described above, it is possible, even without any determination performed by a computer, to set the moving speed of arms 154 to a higher speed when second transfer device 152 move arms 154 toward first transport device 141, thereby further enhancing transport efficiency. The speed of arms 154 moving forward or backward may be controlled by determination performed by a computer.

As a specific example, second transfer device 152 includes hook 155 only at an edge of arm 154 on the first transport device 141 side (the negative side of the X-axis direction in FIG. 3) relative to lift and transport device 150. This makes it possible to reduce the number of components included in second transfer device 152, and enables the one-way transport of load 200 at least from first transport device 141 to lift and transport device 150 or from lift and transport device 150 to second transport device 142, using second transfer device 152.

Each of carry-in and carry-out devices 170 is a device (i) that three-dimensionally overlaps, in a vertical direction, part of at least one of relay devices 140, (ii) part of which is disposed at a location where load 200 is transferred by second transfer device 152 in lift and transport device 150, and (iii) that executes at least one of carrying load 200 into automated storage 110 or carrying load 200 out from automated storage 110. In this example, carry-in and carry-out device 170 is disposed to three-dimensionally intersect the transport routes of transport vehicles 130 above the transport routes of transport vehicles 130. Lift and transport device 150 is configured to raise tray 153 to the level at which load 200 can be transferred between lift and transport device 150 and carry-in and carry-out device 170 by second transfer device 152. Since this enables commonalizing the carrying-in and carrying-out of loads 200 between automated storages, it is possible to reduce the cost of automated storage and retrieval system 100. Moreover, carrying-in and carrying-out can be performed between automated storages 110 with the use of one carry-in and carry-out device 170, and this allows the hand-over of loads 200 between adjacent automated storages 110 or among automated storages 110, irrespective of whether the number of automated storages 110 is single or plural. Automated storage and retrieval system 100 may include dedicated carry-in and carry-out device 170 for carrying-in and dedicated carry-in and carry-out device 170 for carrying-out.

The type of carry-in and carry-out device 170 is not specifically limited to the above, and may be, for example, a conveyor such as a belt conveyor or a roller conveyor.

Since second transfer device 152 is provided on tray 153 in each of lift and transport devices 150 in automated storage and retrieval system 100 according to the example described above, a switching device that switches the transport direction of load 200 need not be provided for each of relay devices 140 disposed at different levels for one lift and transport device 150. This makes it possible to simplify the overall structure of automated storage and retrieval system 100 even when a direction in which each of relay devices 140 transports load 200 is orthogonal to a direction in which load 200 is transferred between lift and transport device 150 and each of relay devices 140, and enhancement in transport efficiency can be expected. A switching device need not be provided for each of carry-in and carry-out devices 170 either.

Moreover, by adopting a configuration in which second transfer device 152 transfers load 200 between relay devices 140 disposed on the both sides of lift and transport device 150 in the transfer direction of second transfer device 152, it is possible to reduce the number of lift and transport devices 150 in automated storage and retrieval system 100, thereby achieving simplification of and space-saving for the overall structure of automated storage and retrieval system 100. By enabling second transfer device 152 to transfer load 200 between relay devices 140 on the both sides of lift and transport device 150, it is also possible to share lift and transport device 150 between two relay devices 140.

By disposing lift and transport device 150 in a space between relay devices 140 included in first automated storage 111 and relay devices 140 included in second automated storage 112, it is possible to narrow the space between the automated storages, thereby enabling reduction in a space for providing the whole automated storage and retrieval system 100.

Our systems are not limited to the example described above. For example, other examples achieved by optionally combining the elements described herein or by excluding some of the elements may be implemented as an example. Our systems encompass variations obtained through various modifications made to the above example by those skilled in the art, that is, within the meaning indicated by the wording used in the appended claims.

Figure 4:
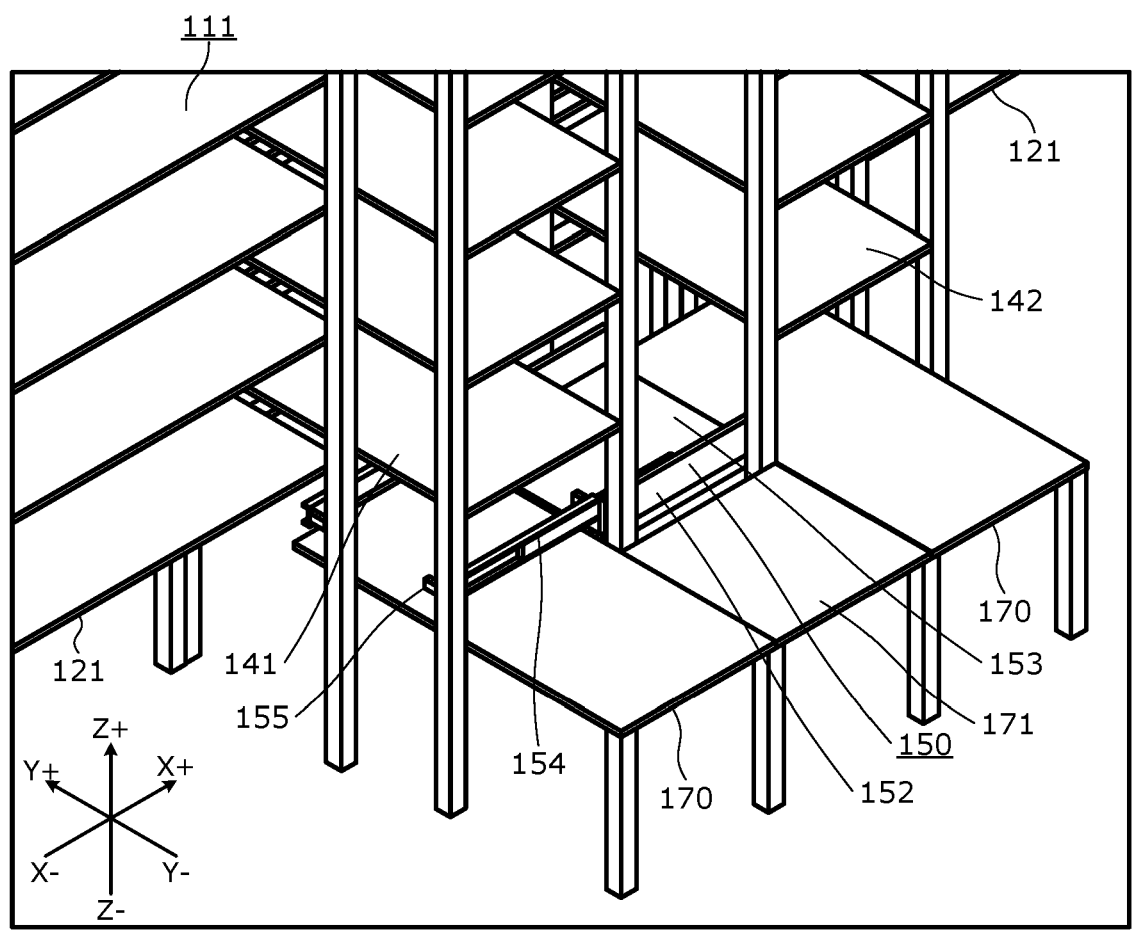
FIG. 4 is a perspective view of part of an automated storage and retrieval system in different arrangement 1.
Figure 5:
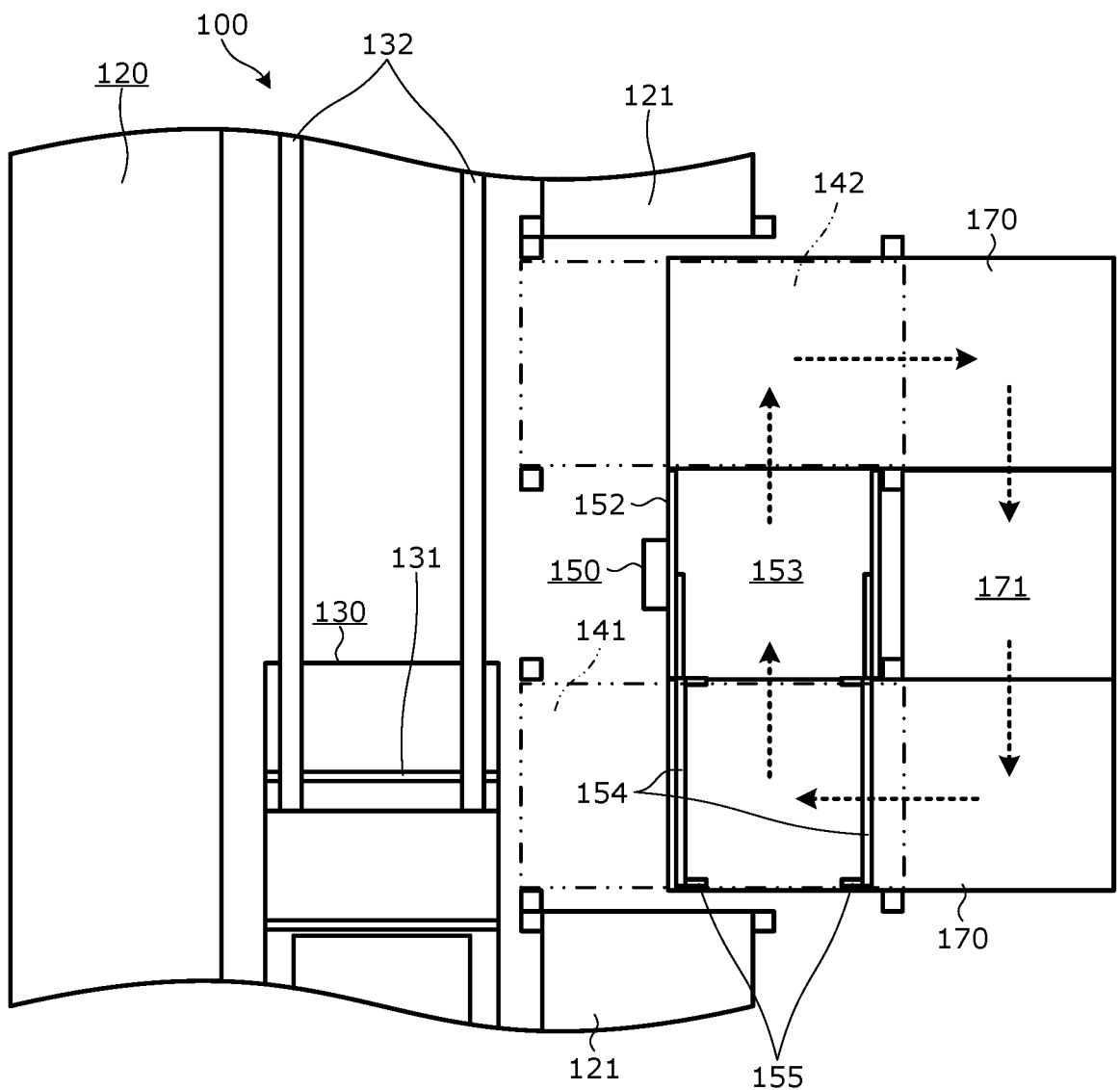
FIG. 5 is a plan view of part of the automated storage and retrieval system in different arrangement 1.

FIG. 4 is a perspective view of part of an automated storage and retrieval system in different arrangement 1. FIG. 5 is a plan view of part of the automated storage and retrieval system in different arrangement 1. As illustrated in these figures, each of first transport devices 141 may transfer 200 between first transport device 141 and corresponding transport vehicle 130 among transport vehicles 130 in first automated storage 111 by first transfer device 131 in corresponding transport vehicle 130, and each of second transport devices 142 may transfer load 200 between second transport device 142 and the same transport vehicle 130 in first automated storage 111.

Carry-in and carry-out device 170 need not intersect the transport routes of transport vehicles 130.

Carry-in and carry-out device 170 may three-dimensionally overlap part of at least one of relay devices 140 at a lower level in a vertical direction in which relay devices 140 are disposed. In this example, lift and transport device 150 may be configured to lower tray 153 to the level at which load 200 can be transferred between lift and transport device 150 and carry-in and carry-out device 170 by second transfer device 152.

Accordingly, it is possible to efficiently transport loads 200 deposited at picking station 171 where load 200 stored in automated storage 110 is retrieved, an item in load 200 is picked up, and load 200 is stored again in automated storage 110.

Figure 6:
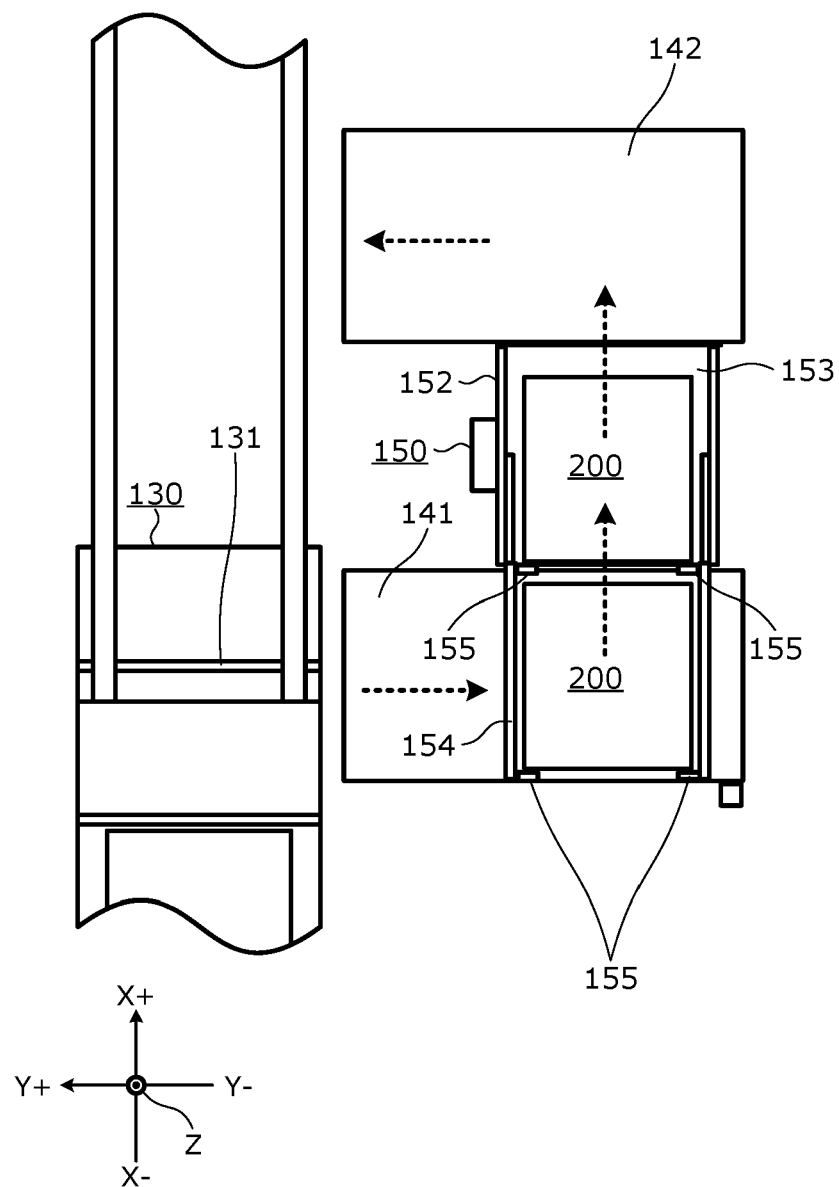
FIG. 6 is a plan view of a state in which two loads are simultaneously transferred.

As illustrated in FIG. 6, controller 160 may control arms 154 of second transfer device 152 in lift and transport device 150 so that when, for instance, one first transport device 141 among first transport devices 141 transports load 200 from corresponding transport vehicle 130 among transport vehicles 130 to lift and transport device 150 and corresponding second transport device 142 among second transport devices 142 transports load 200 from lift and transport device 150 to that corresponding transport vehicle 130, second transfer device 152 transfers load 200 placed on that one first transport device 141 to lift and transport device 150, and at the same time, transfers load 200 placed on lift and transport device 150 to corresponding second transport device 142. In this example, each of arms 154 may be provided with hooks 155 at plural locations in the direction in which load 200 is transferred. Specific examples may include when hooks 155 are located on the rear side (the negative side of the X-axis direction in FIG. 6) of load 200 placed on one first transport device 141 when arms 154 extend toward one first transport device 141; and when hooks 155 are located on the rear side (the negative side of the X-axis direction in FIG. 6) of load 200 placed on tray 153 when arms 154 extend toward one first transport device 141. Accordingly, it is possible to enhance efficiency in transporting loads 200. Load 200 may be hooked by hooks 155 on the front side of load 200.

Although the above has described an example of transport vehicle 130 provided for the corresponding ones of shelf units 121 in racks 120 and includes first transfer device 131, transport vehicle 130 is not limited to such an example. For example, transport vehicle 130 may include a lifter that can raise or lower first transfer device 131 to a level higher or lower than the location of first transfer device 131 by a plurality of shelf units 121 in rack 120. If the lifter can raise first transfer device 131 to a level that is higher than the location of first transfer device 131 by two shelf units 121, for example, transport vehicle 130 and rails 132 are disposed every two shelf units 121 in racks 120. If the lifter can raise first transfer device 131 to a level that is higher than the location of first transfer device 131 by three shelf units 121, for example, transport vehicle 130 and rails 132 are disposed every three shelf units 121 in racks 120. In this example, each of first transport devices 141 and a corresponding one of second transport devices 142 need not be displaced in the X-axis direction at the same level.

Lift and transport device 150 and corresponding ones of relay devices 140 may be disposed at any locations other than those exemplified above.

In automated storage 110, a set of relay devices 140 and another set of relay devices 140, where each of relay devices 140 transports load 200 in the direction (the X-axis direction in the figures) in which racks 120 extend, may be placed aligned between two racks 120 disposed facing each other, and lift and transport device 150 may be disposed in a space between the sets of relay devices 140. In this example, lift and transport device 150 is located outward of the outer lateral sides of the traveling routes of transport vehicles 130. Moreover, a plurality of second transfer devices 152, e.g., two second transfer devices 152 aligned in the Y-axis direction, may be disposed on tray 153 in lift and transport device 150.

Transport directions of load 200 need not be limited as follows: one of the transport directions is for carrying loads 200 into automated storage 110; and the other of the transport directions is for carrying loads 200 out from automated storage 110, as illustrated in FIG. 3. For example, both of the transport directions may be for carrying loads 200 out from automated storage 110.

Relay device 140 may be a member that does not have a transport function and holds load 200.

INDUSTRIAL APPLICABILITY

Our systems can be used for an automated storage and retrieval system including transport vehicles that travel along the corresponding ones of shelves in racks.

The invention claimed is:
1. An automated storage and retrieval system comprising:
a first automated storage including (i) racks each of which includes shelf units in tiers in a vertical direction, each of the shelf units being a shelf unit in which loads are storable along an axis in a horizontal plane, and (ii)

transport vehicles each of which moves along corresponding ones of the shelf units and includes a first transfer device that transfers a load between the transport vehicle and each of the racks;

a second automated storage disposed in parallel to the first automated storage and including (i) racks each of which includes shelf units in tiers in a vertical direction, each of the shelf units being a shelf unit in which loads are storable along an axis in a horizontal plane, and (ii) transport vehicles each of which moves along corresponding ones of the shelf units and includes a first transfer device that transfers a load between the transport vehicle and each of the racks;

a plurality of first transport devices and a plurality of second transport devices, wherein each first transport device that transports a load in a direction in which the first automated storage and the second automated storage are aligned, is disposed at a level corresponding to a location of the first transfer device in a corresponding transport vehicle among the transport vehicles, wherein a load is transferred between the first transport device relay device and the corresponding transport vehicle in the first automated storage by the first transfer device, each first transport device corresponds to a different one of the tiers of the shelf unit in the first automated storage;

each second transport device that transports a load in a direction in which the first automated storage and the second automated storage are aligned, is disposed at a level corresponding to a location of the first transport device in a corresponding transport vehicle among the transport vehicles, wherein a load is transferred between the second transport device and the corresponding transport vehicle in the second automated storage, each second transport device corresponds to a different one of the tiers of the shelf unit in the second automated storage; and lift and transport devices each including (i) a second transfer device that is disposed between the first transport device and the second transport device, and transfers a load between the lift and transport device and each of the first transport device and the second transport device, and (ii) a tray that ascends or descends together with the second transfer device wherein the tray of each lift and transport device transfers a load between its corresponding first transport device and its corresponding second transport device, wherein part of the first transport device is disposed to protrude toward an area where the second automated storage is provided;

part of the second transport device is disposed to protrude toward an area where the first automated storage is provided; and the second transfer device in each of the lift and transport devices (i) includes at least one arm that extends to the first transport device and the second transport device, in a direction intersecting a direction in which the first transport device and the second transport device transport a load, and (ii) transfers a load based on forward or backward movement of the at least one arm.

2. The automated storage and retrieval system according to claim 1, further comprising:

a carry-in and carry-out device (i) that three-dimensionally overlaps, in a vertical direction, part of at least one of the first transport device, (ii) part of which is disposed at a location where a load is transferred by the second transfer device in the lift and transport device, and (iii) that executes at least one of carrying a load into the automated storage or carrying a load out from the first automated storage.

3. The automated storage and retrieval system according to claim 1, further comprising:

a controller that controls the second transfer device so that when one first transport device among the first transport devices transports a load from a corresponding transport vehicle among the transport vehicles to the corresponding lift and transport device and a corresponding second transport device among the second transport devices transports a load from the corresponding lift and transport device to the corresponding transport vehicle, a speed of the at least one arm moving toward the one first transport device is faster than a speed of the at least one arm moving toward the corresponding second transport device.

4. The automated storage and retrieval system according to claim 1, wherein when one first transport device among the first transport devices transports a load from a corresponding transport vehicle among the transport vehicles to the corresponding lift and transport device and a corresponding second transport device among the second transport devices transports a load from the corresponding lift and transport device to the corresponding transport vehicle, the at least one arm of the second transfer device in the corresponding lift and transport device includes a hook only at an edge of the at least one arm on a first transport device side relative to the corresponding lift and transport device, the hook being in contact with a rear surface of the load, the rear surface being a surface of the load on the first transport device side.

5. The automated storage and retrieval system according to claim 1, further comprising:

a controller that controls the at least one arm of the second transfer device so that when one first transport device among the first transport devices transports a load from a corresponding transport vehicle among the transport vehicles to the corresponding lift and transport device and a corresponding second transport device among the second transport devices transports a load from the corresponding lift and transport device to the corresponding transport vehicle, a load placed on the one first transport device is transferred to the corresponding lift and transport device, and at a same time, a load placed on the corresponding lift and transport device is transferred to the corresponding second transport device.

6. An automated storage and retrieval system comprising:

an automated storage including (i) racks each of which includes shelf units in tiers in a vertical direction, each of the shelf units being a shelf unit in which loads are storable along an axis in a horizontal plane, and (ii) transport vehicles each of which moves along corresponding ones of the shelf units and includes a first transfer device that transfers a load between the transport vehicle and each of the racks;

relay devices each of which is disposed at a level corresponding to a location of the first transfer device in a corresponding transport vehicle among the transport vehicles, wherein a load is transferred between the relay device and the corresponding transport vehicle by the first transfer device;

a lift and transport device that includes (i) a second transfer device that transfers a load between the lift and transport device and each of the relay devices, and (ii) a tray that ascends or descends together with the second transfer device; and a carry-in and carry-out device (i) that three-dimensionally overlaps, in a vertical direction, part of at least one of the relay devices, (ii) part of which is disposed at a location where a load is transferred by the second transfer device in the lift and transport device, and (iii) that executes at least one of carrying a load into the automated storage or carrying a load out from the automated storage, wherein the second transfer device in the lift and transport device (i) includes at least one arm that extends to one relay device among the relay devices, in a direction intersecting a direction in which the one relay device transports a load, and (ii) transfers a load based on forward or backward movement of the at least one arm, and the carry-in and carry-out device transports a load along a transport route that three-dimensionally intersects transport routes of the transport vehicles.

* * * * *